United States Patent [19]

Hollowell

[11] Patent Number: 4,727,640

[45] Date of Patent: Mar. 1, 1988

[54] EASILY ASSEMBLED SEAT BELT RETRACTOR AND METHOD

[75] Inventor: William Hollowell, Pacific Palisades, Calif.

[73] Assignee: American Safety Equipment Corp., Troy, Mich.

[21] Appl. No.: 897,625

[22] Filed: Sep. 18, 1986

Related U.S. Application Data

[60] Continuation of Ser. No. 757,886, Jul. 23, 1985, abandoned, which is a division of Ser. No. 536,292, Sep. 27, 1983, Pat. No. 4,562,977.

[51] Int. Cl.$^4$ .................... B60R 22/34; B23P 11/00
[52] U.S. Cl. .................... 29/434; 242/107.4 D; 29/453; 29/525
[58] Field of Search ............ 242/107.4 R-107.4 E, 242/107; 280/803, 806–808; 297/475–478; 29/434, 525, 453

[56] References Cited

U.S. PATENT DOCUMENTS

| | | | |
|---|---|---|---|
| 3,058,687 | 10/1962 | Bentley | 242/107.4 B |
| 3,180,456 | 4/1965 | Whittingham | 242/107.4 B X |
| 3,944,163 | 3/1976 | Hayashi et al. | 242/107.4 D X |
| 4,141,518 | 2/1979 | Yamanashi | 242/107.4 B X |
| 4,393,995 | 7/1983 | Tukamoto | 242/107.4 B X |
| 4,483,495 | 11/1984 | Honl | 242/107.4 A |

FOREIGN PATENT DOCUMENTS 1361695  7/1963  France .

Primary Examiner—John M. Jillions
Attorney, Agent, or Firm—Poms, Smith, Lande & Rose

[57] ABSTRACT

A method for assembling a safety belt retractor in which the belt storage spool shaft and belt rub protector discs are assembled and installed simultaneously to the retractor frame. Easily assembled belt storage spool shaft and related ratchet wheel, deactivator disc, lock bar and belt return spring are also provided.

9 Claims, 12 Drawing Figures

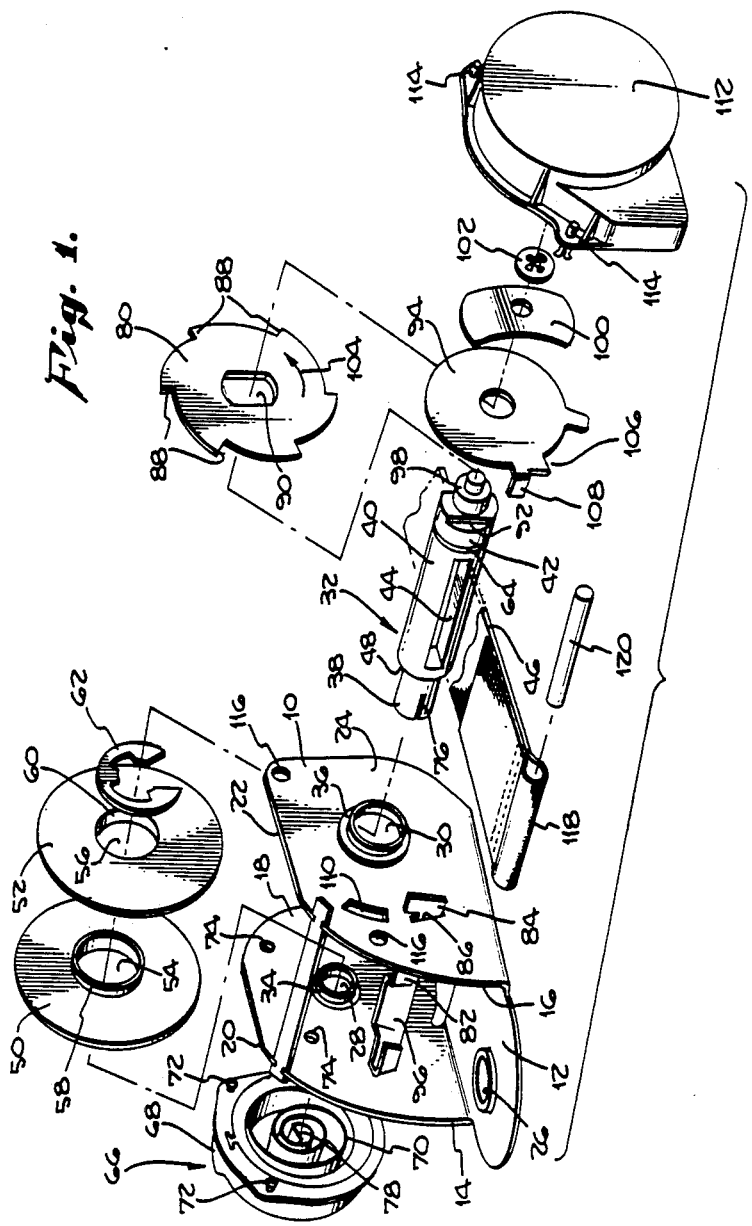

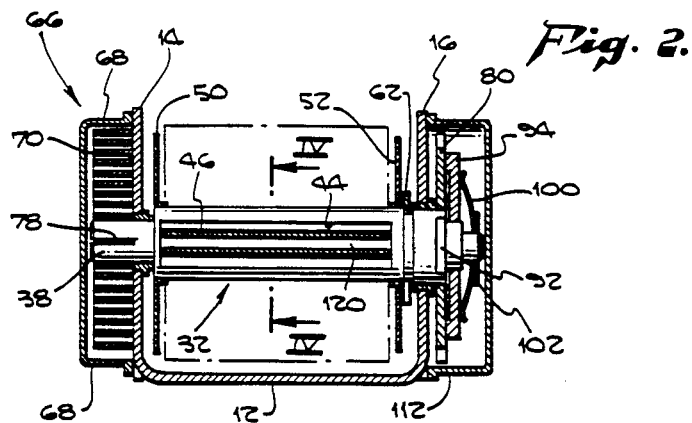
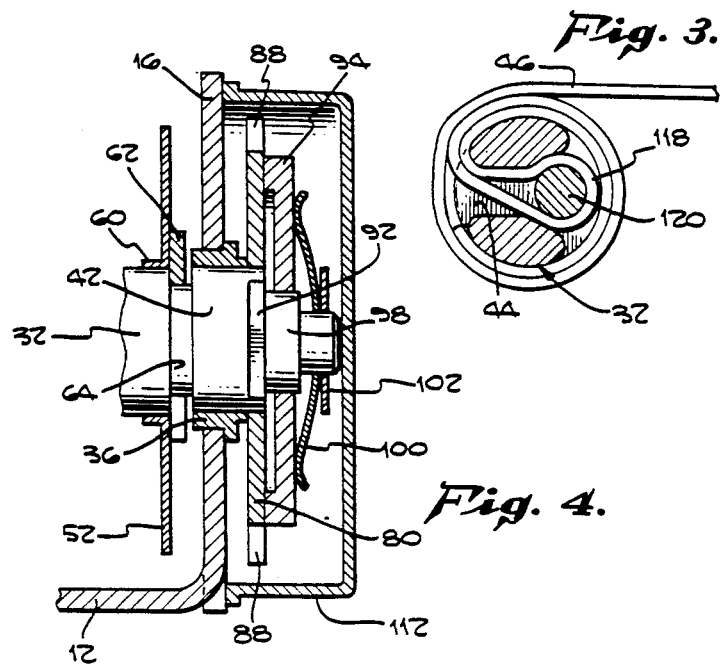

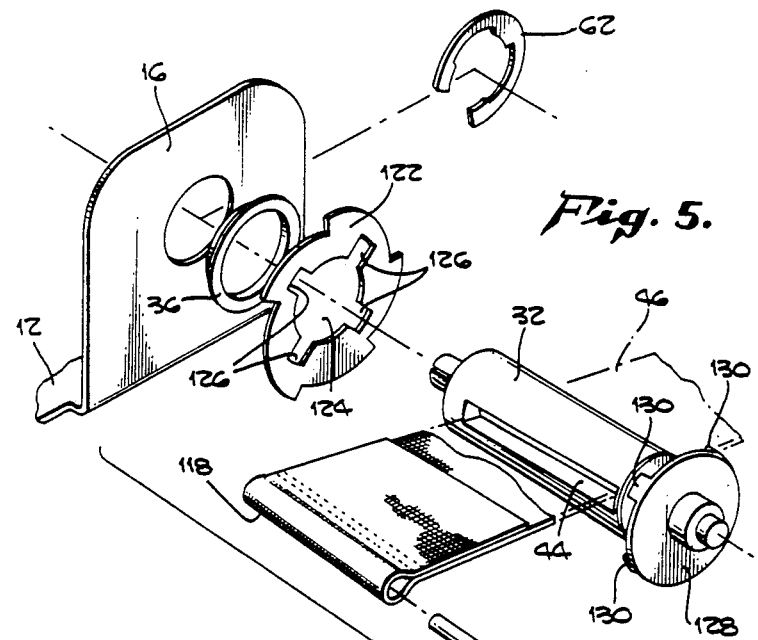
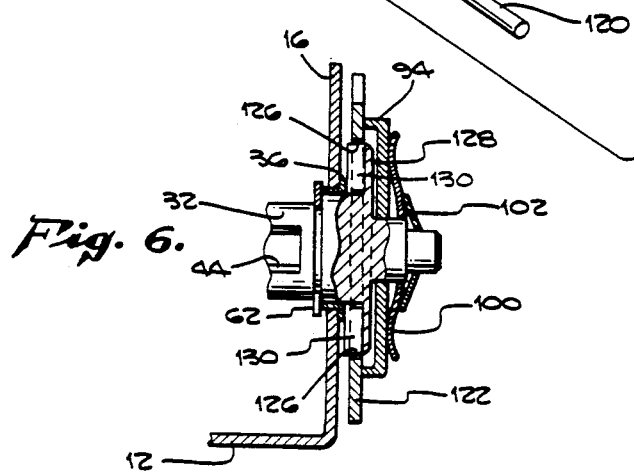

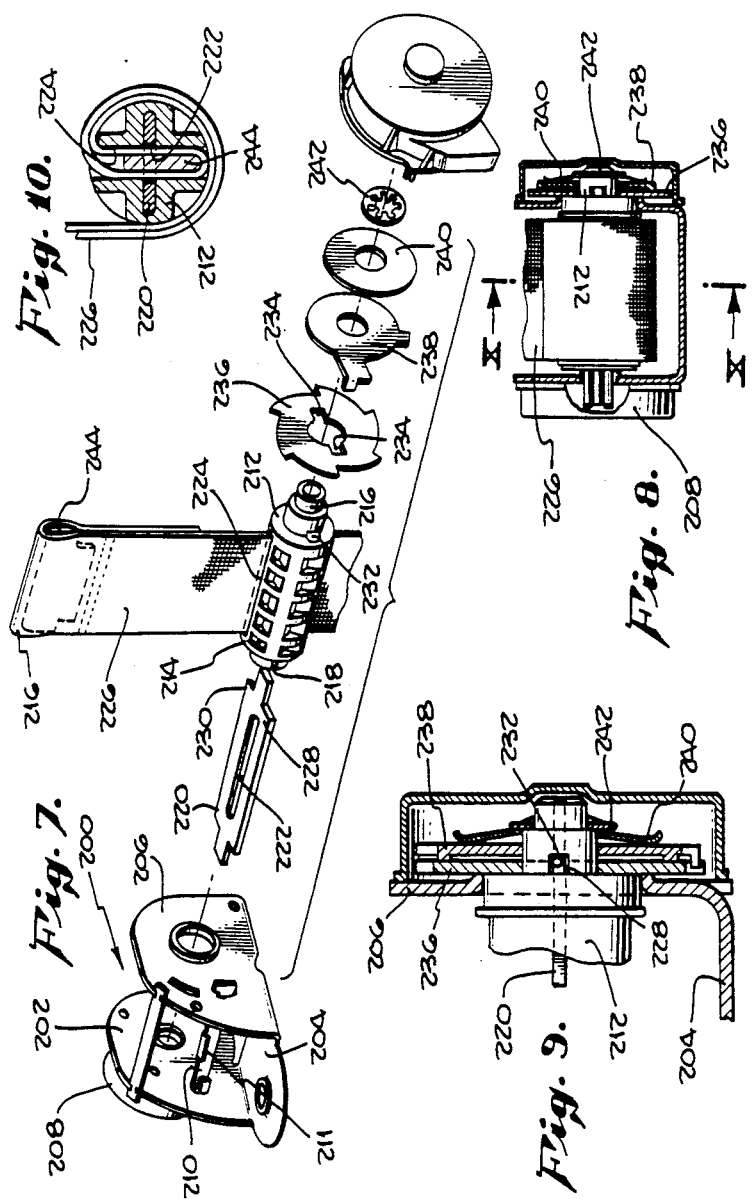

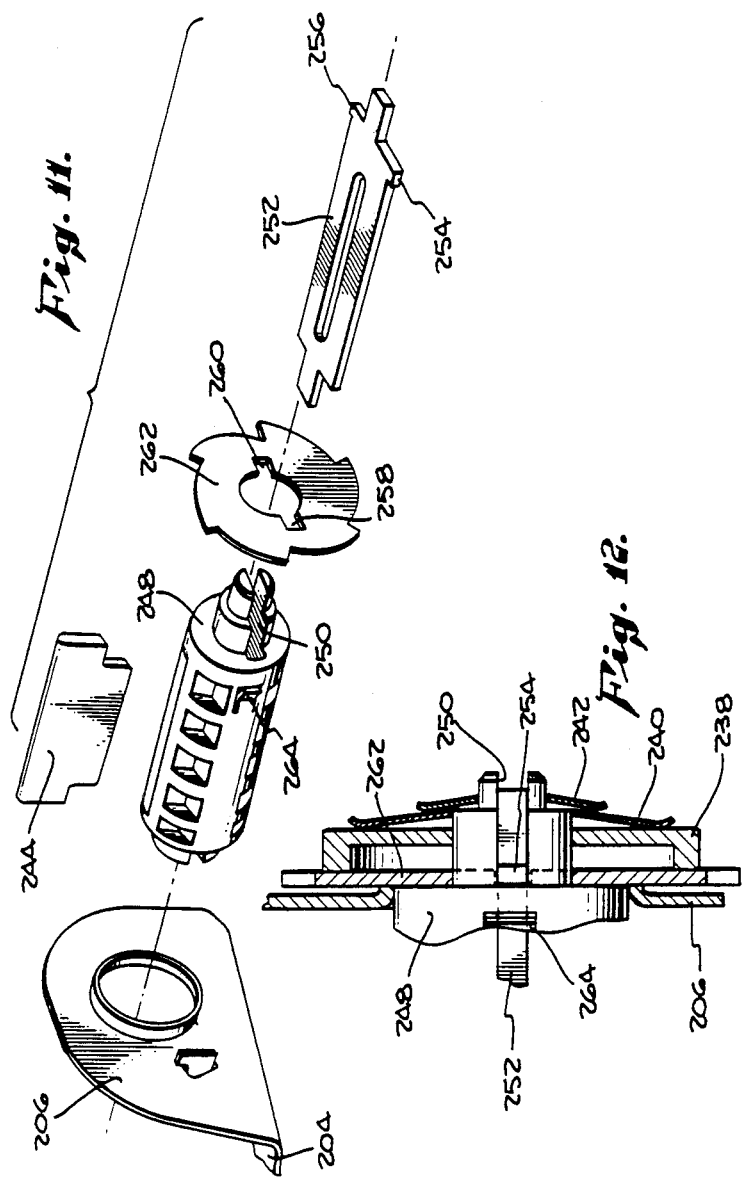

EASILY ASSEMBLED SEAT BELT RETRACTOR AND METHOD

This application is a continuation of application Ser. No. 757,886, filed July 23, 1985, now abandoned, which is a division of application Ser. No. 536,292, filed Sept. 27, 1983, now U.S. Pat. No. 4,562,977.

BACKGROUND OF THE INVENTION

The present invention relates generally to seat belt retractors for use in safety restraint systems. More particularly, the present invention relates to seat belt retractor devices which are easily assembled and disassembled.

A wide variety of seat belt retractor devices are widely used in safety restraint systems. Seat belt retractors typically include: a housing or frame structure, a belt storage spool which is rotatably mounted to the retractor frame, a biasing spring or some other biasing means for providing retractive rotation of the belt storage spool and some type of ratchet or control mechanism to lock the belt storage spool to prevent further extension of the belt when the seat belt is in the desired extended position about a passenger.

Storage spools include belt rub protector discs mounted on the spool ends to guide the belt during rotation of the spool and prevent the belt from rubbing against the retractor frame. The usual assembly procedure for such retractors involves initially mounting and winding the seat belt onto the spool. The spool is then inserted into the retractor frame and rotatably mounted by, for example, sliding an axle through the frame and spool. The use of a separate mounting axle and spool is not desirable since it increases the number of parts required for the retractor. Further, the structural weight and strength of the spool is wasted since the spool itself is only mounted to the frame by way of the axle. It would be desirable to provide a method for assembling a belt spool having belt rub protector discs which does not require the separate installation of a spool and mounting axle.

After the belt spool is mounted within the retractor frame, the other auxiliary retractor mechanisms and parts are assembled and mounted to the retractor frame. Typically, this assembly procedure is complicated and costly. It would be desirable to provide a simple belt retractor mechanism which can be easily assembled and disassembled to provide inexpensive installation of the retractor while also allowing easy disassembly of the retractor for inspection and repair.

SUMMARY OF THE INVENTION

In accordance with the present invention, a method is provided for quickly and easily assembling a seat belt retractor. A seat belt retractor including a number of desirable features is also disclosed which is particularly well suited for easy assembly in accordance with the present invention.

The present invention is based upon a method for assemblying a safety belt retractor in which a retractor frame having a bottom and left and right side walls is provided. The left and right side walls have inside faces facing each other with each wall also having a belt storage spool shaft receiving opening. A left belt rub protector disc and a right belt protector disc, each having a centrally located transverse shaft receiving opening are provided. The left and right rub protector discs are positioned adjacent the left and right frame wall inside faces respectively so as to axially align the disc shaft receiving openings with the shaft receiving openings in the retractor frame walls. A belt storage spool shaft is then inserted through the receiving openings and rotatably mounted to the frame. The belt rub protector discs are then secured to the belt storage spool shaft at their spaced locations adjacent the frame walls.

The method of assembly in accordance with the present invention is an improvement over prior assembly techniques since it provides for fabrication or assembly of the belt storage spool simultaneously with insertion and mounting of the spool within the retractor frame.

As another feature of the present invention, the shaft receiving opening in the left side wall is smaller than the shaft receiving opening in the right side wall. The belt storage spool shaft left end is reduced in size to fit within the smaller shaft receiving opening in the left side wall. This provides a shoulder on the belt storage spool shaft which abuts against the left side wall to provide positioning of the belt storage spool shaft. Further, a retainer ring or some other retaining device is placed on the belt spool shaft adjacent the right wall inside face to prevent transverse movement of the shaft towards the right side wall.

An another feature of the present invention, the right end of the storage spool shaft extends outside the retractor frame and is adapted to mount various devices such as the ratchet wheel disc and deactivator disc which are used in controlling retraction and extension of the belt. Mounting of the ratchet wheel disc and deactivator disc along with the other auxiliary retractor parts on the outside of the retractor frame simplifies assembly of the retractor. This is an improvement over retractor frames in which the ratchet wheel and associated activation and deactivation mechanisms are located on the inside of the retractor frame between the frame walls and belt storage spool.

As an additional feature of the present invention, the belt storage spool shaft is provided as a two piece shaft having an outer lightweight plastic portion and an inner high strength metal support plate. The support plate is insertable within a longitudinal slot within the plastic shaft portion. An improved method for mounting the ratched wheel to the shaft support plate is also disclosed.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is an exploded view of a first preferred embodiment of a seat belt retractor in accordance with the present invention.

FIG. 2 is a sectional view of the assembled seat belt retractor shown in FIG. 1.

FIG. 3 is an enlarged sectional view of the right hand portion of FIG. 2.

FIG. 4 is a sectional view of FIG. 2 taken in the IV—IV plane.

FIG. 5 is an exploded view of a portion of a second preferred embodiment in accordance with the present invention.

FIG. 6 is a sectional view of the assembled right hand portion of the retractor shown in FIG. 5.

FIG. 7 is an exploded view of a third preferred embodiment in accordance with the present invention.

FIG. 8 is a sectional view of the assembled retractor shown in FIG. 7.

FIG. 9 is a sectional view of the right hand portion of the retractor shown in FIG. 8.

FIG. 10 is a sectional view of FIG. 8 taken in the X—X plane.

FIG. 11 is a partial exploded view of an alternate embodiment of the retractor shown in FIG. 7.

FIG. 12 is a sectional view of the right side of the retractor shown in FIG. 11.

DETAILED DESCRIPTION OF THE INVENTION

A first preferred exemplary embodiment of the present invention is shown in an exploded view in FIG. 1. The safety belt retractor includes a retractor frame 10. The retractor frame 10 includes a bottom 12, left side wall 14 and right side wall 16. The left side wall has an inside face 18 and an outside face 20. The right side wall 16 has an inside face 22 and an outside face 24. The retractor frame bottom 12 includes a mounting hole 26 for securing the retractor frame 10 to the vehicle. Both the left and right retractor frame sidewalls 14 and 16 have belt shaft receiving openings 28 and 30 respectively. The belt shaft receiving openings 28 and 30 are sized for mounting the storage spool shaft shown generally at 32. Means for rotatably mounting the storage spool shaft 32 within the belt shaft receiving openings 28 and 30 are provided by bushings or bearings 34 and 36.

The belt storage spool shaft 32 includes a left end 38, a middle portion 40 and a right end 42. The shaft 32 also includes a transverse passageway 44 which is of sufficient size for receiving the seat belt 46. The storage spool shaft left end 38 is smaller in diameter than the storage spool shaft middle portion 40. A shoulder 48 is therefore present on the storage spool shaft 32 between the left end 38 and middle portion 40.

A left belt rub protector disc 50 and right belt rub protector disc 52 are provided for positioning the seat belt 46 during extension and retraction. In addition, the belt rub protector discs 50 and 52 prevent the belt from rubbing against the frame walls 14 and 16. Both the left and right belt rub protector discs 50 and 52 each have centrally located shaft receiving openings 54 and 56 respectively.

The method for assembling the safety belt retractor involves positioning the left belt rub protector disc 50 adjacent the left side wall so as to align the left disc receiving opening 54 with the left wall receiving opening 28. The right belt rub protector disc is positioned adjacent the right side wall inside face 20 so as to align the right disc receiving opening 56 with the right belt shaft receiving opening 30. The storage spool shaft 32 is then inserted through the shaft receiving openings 30, 54, 56 and 28.

Means for securing the belt rub protector discs to the belt storage spool shaft 32 are provided by circular collars 58 and 60. The collars 58 and 60 are preferably integral with the left and right belt rub protector discs 50 and 52. The collars 58 and 60 are preferably press fitted, crimped or otherwise securely attached to the storage spool shaft 32.

Positioning of the storage spool shaft 32 within the retractor frame 10 is provided by the shaft shoulder 48 which abuts against the bearing or bushing 34 to prevent further movement of the shaft 32 towards or through the left side wall 14. The storage spool shaft 32 is further positioned within the retractor frame 10 by means of snap ring 62 and groove 64 in the storage spool shaft 32. Once the storage spool shaft 32 is inserted into position, the snap ring 62 is snapped into position in groove 64 adjacent the right bearing 36 to position storage spool shaft 32 securely within retractor frame 10.

Once the belt storage spool shaft 32 and associated belt rub protector discs 50 and 52 are assembled and mounted within the retractor frame 10, the other elements of the seat belt retractor may be assembled. Means for biasing the belt shaft in a belt retraction diection is provided by the rewind spring assembly shown generally at 66. The rewind spring assembly 66 includes a spring housing 68 and spring 70. Fasteners 72 are provided for fasening the housing to the retractor frame left wall 14 by way of mounting holes 74. The belt shaft left end 38 includes a slot 76 into which one end 78 of spring 70 is inserted to connect the spring 70 to the belt shaft 32 for spring biasing of the shaft in a rewind direction.

Ratchet means for preventing extension of the safety belt upon actuation at selected positions between the belt retractor and belt extended position includes ratchet wheel 80 and lock bar 82. The lock bar 82 includes a ratchet engagement tab 84 which is positioned on the outside of the retractor frame 10. The slot 86 in the right side wall 16 in which lock bar 82 is mounted is of sufficient size so that the ratchet engagement tab 84 is movable between a position out of engagement with ratched teeth 88 and a blocking position in engagement with teeth 88.

Means for mounting ratchet wheel 80 to the belt storage spool shaft preferably include a rectangular or square shaped opening 90 which fits matingly on a corresponding rectangular or square shaped portion 92 on the belt shaft 32. Other mating ratchet wheel openings and shaft portions are possible so long as the shapes are such that common rotation only of the ratchet wheel 80 and belt storage spool shaft 32 is possible.

Means for actuating the lock bar 82 into and out of engagement with teeth 88 is provided by deactivator disc 94 and belt sensor bar 96. During winding of the safety belt 46 around the belt storage spool shaft 32, the diameter of the combined shaft and wound belt continually increases until substantially all of the seat belt is wound around the shaft. The sensor bar 96 is positioned adjacent the storage spool shaft 32 so that winding of the seat belt past a certain retractive position gradually forces the lock bar 82 away from a position of possible engagement with teeth 88. As a result, when the safety belt 46 is completely wound around belt storage shaft 32, the lock bar 82 is moved to a ratchet wheel disengaged position by way of belt sensor 96. As the belt is unwound, the lock bar 82 is biased inward by a biasing spring (not shown) which gradually moves the lock bar into an engagement position with ratchet teeth 88. The deactivator disc 94 is provided to prevent the lock bar 82 from engaging the ratchet wheel 80 until the belt has extended to the desired position about a passenger.

The deactivator disc 94 is rotatably mounted upon the belt storage spool shaft 32 by way of stud 98. The deactivator disc 94 is biased against the ratchet wheel 80 by way of clutch spring 100. The clutch spring 100 is held in place by retainer clip 102. During unwinding rotation of the ratchet wheel 80 in the direction shown by arrow 104, a deactivator cam 106 is rotated into contact with ratchet engagement tab 84 to move the tab 84 away from or otherwise prevent possible engagement with teeth 88. During unwinding of a fully rewound seat belt, both belt sensor 96 and deactivator tab 106 prevent the ratchet engagement tab 84 from contacting teeth 88. As the belt is extended, the wound portion of the belt moves away from the belt sensor 96 so that only deactivator cam 106 is holding the ratchet engagement tab 84 away from teeth 88. When the belt is placed in position about a passenger and subjected to a slight rewinding movement, the deactivator cam 106 moves away from ratchet engagement tab 84 to allow the ratchet engagement tab 84 to engage one of the teeth 88 to prevent further extension of the seat belt. Movement of deactivation cam 106 away from ratchet engagement tab 84 is controlled by tab 108 and slot 110.

The ratchet engagment tab 84 remains in contact with the ratchet wheel 80 during rewinding of the seat belt until the web sensor 96 contacts the wound portion of the seat belt and moves the lock bar 82 and ratchet engagement tab 84 away from the ratchet wheel 80. The shape of teeth 88 allow rewinding movement of ratchet wheel 80 while the engagement tab 84 rides over the pawls 88; however any unwinding or extension of the belt is prevented until the engagement tab 84 is moved away from the teeth 88. Once the engagement tab 84 is moved from its blocking position by way of web sensor 96, subsequent extension of the seat belt rotates the deactivator cam 106 back into its blocking position as previously described to allow extension of seat belt 46 to any desired position. Housing 112 is provided for enclosing the ratchet wheel 80 and deactivator disc 94. The housing 112 is preferably fastened by way of fasteners 114 to holes 116.

Although any number of methods may be used for securing the seat belt 46 to the belt storage spool shaft 32, it is preferred that the seat belt 46 be formed into a loop 118 into which a rigid belt bar 120 can be inserted. The mounting of the seat belt using the loop 118 and belt bar 120 is best shown in FIG. 4.

A second embodiment of the present invention is shown in FIG. 5. The retractor frame 10 and related parts are the same as the previously described retractor of FIG. 1 except that a modified ratchet wheel 122 and modified means for mounting the ratchet wheel 122 to the belt storage spool shaft 32 is provided. The ratchet wheel 122 includes an opening 124 having radially extending slots 126. A mounting collar 128 is securely attached to shaft 32 by press fitting or other means. The mounting collar 28 includes tabs 130 which fit into slots 126 in ratchet wheel 122 to secure the ratchet wheel 122 to the belt storage spool shaft 32. This arrangement provides a preferred strong structural attachment of the ratchet wheel 122 to the shaft 32 to ensure optimum structural locking of ratchet wheel 122 to the shaft 32.

Another preferred alternate embodiment of the present invention is shown in FIGS. 7, 8, 9 and 10. The retractor is basically the same as the retractor shown in FIG. 1 except that a different preferred belt storage shaft is provided. As best shown in FIG. 7, this alternate preferred safety belt retractor includes a frame shown generally at 200. The frame includes a left wall 202, bottom 204 and right wall 206. The frame 200 is basically the same as frame 10 and also includes a rewind bias spring 208, block bar 210 and web sensor 211.

The belt storage spool shaft 212 is preferably made from a lightweight plastic or metal material. The lightweight shaft includes a left end 214 and a right end 216. The lightweight shaft 212 further includes a longitudinal slot 218 into which a rigid support plate such as metal plate 220 can be inserted. Both the metal plate 220 and shaft 312 include transverse passageways 222 and 224 respectively for receiving the seat belt 226. The support plate 220 includes shoulder portions 228 and 230 which protrude from the lightweight shaft 212 at 232. The shoulders engage slots 234 in ratchet wheel 236 to provide secure engagement of the ratchet wheel 236 to the lightweight shaft 212. The remainder of the seat belt assembly including the deactivator disc 238, clutch spring 240 and retaining slip 242 are similar to and function the same as the retractor described in FIG. 1.

The means for mounting the seat belt 226 to the prefered retractor shown in FIG. 7 includes a rigid support plate 244 which is inserted within belt loop 246. The rigid bar 244 is shaped to fit within the belt opening 222 in plate 220 as best shown in FIG. 10.

A further alternate embodiment is shown in FIGS. 11 and 12. The lightweight belt storage spool shaft 248 shown in FIG. 11 includes a longitudinal slot 250 which extends entirely through the lightweight shaft 248. The rigid support plate 252 includes shoulder tabs 254 and 256 which fit matingly within slots 258 and 260 in ratchet wheel 262. Further, one or more compressable tabs such as tab 264 is provided on the lightweight shaft 248 to replace the snap ring 62 used in the previous embodiments to secure the belt storage spool shafts within the retractor frame. The remainder of the alternate retractor embodiment shown in FIG. 11 is the same as the retractor shown in FIGS. 7-10.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A method for assembling a safety belt retractor comprising the steps of:

providing a retractor frame having n integrally formed bottom and left and right side walls and open top, said side walls having inside faces facing each other and outside faces, said side walls each also having a belt storage spool shaft receiving opening for rotatable mounting of a belt storage spool shaft, wherein said storage spool shaft receiving opening in said left side wall is smaller than the storage spool shaft receiving opening in said right side wall;

providing a belt storage spool shaft having a left end, a middle portion, a right end and a transverse passageway through said storage spool shaft middle portion of sufficient size for receiving a safety belt wherein said storage spool shaft left end has a reduced diameter portion insertible within said left side wall opening for rotatable mounting and a shoulder between said reduced diameter end portion and said shaft middle portion;

providing a left belt rub protector disc and a right belt rub protector disc, each disc having a centrally located transverse storage spool shaft receiving opening around which is located a concentric collar that is integral with each of said belt rub protector discs;

positioning said left belt rub protector disc adjacent said left frame wall inside face so as to axially align the left disc storage spool shaft receiving opening with the left wall storage spool shaft receiving opening;

positioning said left belt rub protector disc adjacent said right frame wall inside face so as to axially align the right disc storage spool shaft receiving opening with the right wall storage spool shaft receiving opening;

inserting said belt storage spool shaft left end through said storage spool shaft receiving opening in said right frame wall and through said belt rub protector discs to position said left storage spool shaft end within said left frame wall opening and to position said shoulder on said belt storage spool shaft adjacent to the inside wall of said left side wall to provide positioning of said belt storage spool shaft in said retractor frame and to rotatably mount said belt storage spool shaft to said frame;

securing said belt storage spool shaft to said frame to prevent transverse movement to the right of said belt storage spool shaft relative said frames; and securing said belt rub protector discs to said belt storage spool shaft at spaced locations adjacent said frame walls by press fitting said collars to said belt storage spool shaft after said storage spool shaft is inserted through said shaft receiving opening in said right frame wall.

2. A method according to claim 1 wherein the step of securing said belt storage spool shaft to said frame includes placing retaining ring means on said storage spool shaft adjacent said right side wall inside face to prevent transverse movement of said storage spool shaft towards said right side wall, said storage spool shaft shoulder and retaining ring means thereby preventing transverse movement of said storage spool shaft when mounted in said retractor frame.

3. A method for assembling a safety belt retractor according to claim 2 wherein said reduced diameter storage spool shaft portion includes an end portion extending through said left side wall when said storage spool shaft is mounted in said retractor frame and adapted to engage a storage spool shaft rewind spring, said method further including the step of mounting a storage spool shaft rewind spring on the outside of said left side wall for engagement with said reduced diameter storage spool shaft end portion to provide spring biasing of said storage spool shaft in a rewind direction.

4. A method for assembling a safety belt retractor according to claim 3 wherein said belt storage spool shaft right end includes a ratchet wheel mounting portion on the outside of said right wall when said belt storage spool shaft is rotatably mounted to said retractor frame, said retractor further including a lock bar mounted transversely between said left and right side walls and extending through said right side wall, said lock bar being rotatably movable about its longitudinal axis between a ratchet wheel engaged position and a ratchet wheel disengaged position, said method including the further step of fixedly mounting a ratchet wheel disc to said belt storage spool shaft ratchet wheel mounting portion on the outside of said retractor frame, said ratchet wheel disc having an outer radial surface positioned for engagement with said lock bar portion extending outside said retractor frame when said lock bar is in said ratchet wheel engaged position to thereby prevent unwinding rotation of said belt storage spool shaft.

5. A method according to claim 4 wherein said ratchet wheel mounting portion has a non-circular cross section and including the step of mounting said ratchet wheel by a centrally located opening of sufficient size and shape to be non-rotatably positioned on said ratchet wheel mounting portion.

6. A method according to claim 4 wherein said belt storage spool shaft includes a longitudinal slot extending from said belt storage spool shaft left end to said belt storage spool shaft right end, said method including the further step of inserting a support plate within said longitudinal slot, said support plate including a left end, a right end and a transverse passageway through said support plate through which said safety belt may be passed.

7. A method according to claim 6 wherein said belt storage spool shaft is made from lightweight plastic and said support plate is made from a structurally strong metal.

8. A method according to claim 6 wherein a shoulder portion is provided at said support plate right end and wherein a slot is provided in said ratchet wheel disc opening for receiving said support plate shoulder to thereby fix said ratchet wheel disc to said storage spool shaft.

9. A method according to claim 4 including the further steps of mounting a deactivator disc on said belt storage spool shaft, said deactivator disc including a deactivator cam located on the radially outward surface of said deactivator disc for engagement with said lock bar during unwinding rotation of said belt storage spool shaft to thereby prevent said locking bar from engaging said ratchet disc, and biasing said cam away from said lock bar during rewinding movement of said storage spool shaft to allow engagement of said lock bar with said ratchet disc.

* * * * *